(12) United States Patent
Shin

(10) Patent No.: US 11,727,106 B2
(45) Date of Patent: Aug. 15, 2023

(54) CHARGING CONTROL METHOD AND APPARATUS FOR ELECTRIC VEHICLE

(71) Applicants: Hyundai Motor Company, Seoul (KR); Kia Motors Corporation, Seoul (KR); Myongji University Industry and Academia Cooperation Foundation, Gyeonggi-Do (KR)

(72) Inventor: Min Ho Shin, Gyeonggi-do (KR)

(73) Assignees: Hyundai Motor Company, Seoul (KR); Kia Motors Corporation, Seoul (KR); Myongji University Industry and Academia Cooperation Foundation, Gyeonggi-do (KR)

( * ) Notice: Subject to any disclaimer, the term of this patent is extended or adjusted under 35 U.S.C. 154(b) by 437 days.

(21) Appl. No.: 16/810,027

(22) Filed: Mar. 5, 2020

(65) Prior Publication Data

US 2020/0282859 A1    Sep. 10, 2020

(30) Foreign Application Priority Data

Mar. 5, 2019 (KR) .......................... 10-2019-0025299
Feb. 17, 2020 (KR) .......................... 10-2020-0019037

(51) Int. Cl.
| | |
|---|---|
| G06F 21/44 | (2013.01) |
| B60L 53/66 | (2019.01) |
| B60L 53/68 | (2019.01) |
| G06F 21/30 | (2013.01) |
| G06F 21/31 | (2013.01) |

(52) U.S. Cl.
CPC .............. *G06F 21/44* (2013.01); *B60L 53/66* (2019.02); *B60L 53/68* (2019.02); *G06F 21/30* (2013.01); *G06F 21/31* (2013.01)

(58) Field of Classification Search
None
See application file for complete search history.

(56) References Cited

U.S. PATENT DOCUMENTS

| | | | | |
|---|---|---|---|---|
| 9,300,152 | B2 * | 3/2016 | Juhasz | H02J 7/00 |
| 9,348,381 | B2 * | 5/2016 | Khoo | B60L 53/67 |
| 2014/0325218 | A1 * | 10/2014 | Shimizu | H04W 4/24 |
| | | | | 713/168 |
| 2018/0012433 | A1 * | 1/2018 | Ricci | A61B 5/1176 |
| 2018/0336551 | A1 * | 11/2018 | Mouftah | G06Q 20/202 |
| 2018/0345810 | A1 * | 12/2018 | Shuaib | H02J 7/0027 |

* cited by examiner

*Primary Examiner* — Brandon Hoffman
(74) *Attorney, Agent, or Firm* — Fox Rothschild LLP

(57) ABSTRACT

A charging control method, performed by an electric vehicle supply equipment (EVSE), is provided. The method includes performing a charging session initiation procedure with an EV and calculating a session script hash associated with a charging session. A session access request is received from a user device and confirmed. Based on a result of the confirmation, session authentication is requested to the user device and a session script authentication value is received as a result of the session authentication from the user device. The method also includes determining whether to allow a user access to the charging session according to the session script authentication value.

14 Claims, 11 Drawing Sheets

FIG. 9

SessionSetupRes message

```
<?xml version="1.0" encoding="UTF-8"?>
<v2gci_d:V2G_Message xmlns:v2gci_b="urn:iso:15118:2:2015:MsgBody"
xmlns:v2gci_d="urn:iso:15118:2:2015:MsgDef"
xmlns:v2gci_t="urn:iso:15118:2:2015:MsgHeader"
xmlns:xmldsig="http://www.w3.org/2000/09/xmldsig#"
xmlns:v2gci_b="urn:iso:15118:2:2015:MsgBody"
xmlns:xsi="http://www.w3.org/2001/XMLSchema-instance">
    <v2gci_d:Header>
        <v2gci_b:SessionID>0031323334353637</v2gci_b:SessionID>
    </v2gci_d:Header>
    <v2gci_d:Body>
        <v2gci_b:SessionSetupRes>
            <v2gci_b:ResponseCode>OK</v2gci_b:ResponseCode>
            <v2gci_b:EVSEID>FRA123456789C</v2gci_b:EVSEID>
        </v2gci_b:SessionSetupRes>
    </v2gci_d:Body>
</v2gci_d:V2G_Message>
```
~901

80 98 02 00 0C 4C 8C CD 8D 4D 8D B1 20 00 39 19 49 04 C8 CD 1A D0 D5 00 DC 21 8C 80
~902

CHARGING CONTROL METHOD AND APPARATUS FOR ELECTRIC VEHICLE

CROSS-REFERENCES TO RELATED APPLICATIONS

This application claims the benefit of priority to Korean Patent Application No. 10-2019-0025299, filed on Mar. 5, 2019, and Korean Patent Application No. 10-2020-0019037, filed on Feb. 17, 2020, the entire contents of which are incorporated herein by reference.

TECHNICAL FIELD

The present disclosure relates to a method and an apparatus for charging of an electric vehicle (EV), and more specifically, to a method and an apparatus for controlling EV charging through authentication-related information sharing.

BACKGROUND

An electric vehicle (EV) drives an electric motor by a power of a battery, and has less air pollution sources such as exhaust gas and noise compared with a conventional gasoline engine vehicle, fewer faults, a long life span, and, advantageously, the operation of the EV is simplified. The EVs are classified into hybrid electric vehicles (HEVs), plug-in hybrid electric vehicles (PHEVs), and electric vehicles (EVs), based on a driving source. The HEV has an engine as a main power and a motor as an auxiliary power. The PHEV has a main power motor and an engine used when a battery is discharged. The EV has a motor, but the EV does not have an engine.

An electric vehicle (EV) charging system may be defined as a system for charging a high-voltage battery mounted within an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type").

The EV charging control may be performed via a communication protocol between an EV and a charging station. Therefore, the controls on an EV charging session should be performed by the charging station or the EV. At this time, a user is required to check the status of the charging of the EV or control the charging progress. However, when the user performs all the controls only through the EV, remote control is difficult, and a substantial amount of time and money are required to change the monitoring or control function of the EV.

SUMMARY

The present disclosure provides a charging control method performed by an electric vehicle supply equipment (EVSE) and a charging control apparatus using the charging control method. The present disclosure also provides a charging control method performed by an electric vehicle (EV) and a user device performing user authentication for charging with an EVSE.

According to exemplary embodiments of the present disclosure, a charging control method, performed by an EVSE, may include performing a charging session initiation procedure with an EV; calculating a session script hash associated with a charging session; receiving and confirming a session access request from a user device; requesting session authentication to the user device based on a result of confirming the session access request; receiving a session script authentication value as a result of the session authentication from the user device; and determining whether to allow a user access to the charging session according to the session script authentication value.

The session script hash may be calculated using a hash chaining scheme based on a plurality messages exchanged in the charging session initiation procedure between the EV and the EVSE before actual power transfer. The plurality of messages in the charging session initiation procedure may be represented in an efficient extensible markup language (XML) interchange (EXI) format.

The plurality of messages in the charging session initiation procedure may include at least one of a Supported Application Protocol Req/Res message, a Session Setup Req/Res message, a Service Discovery Req/Res message, a Service Detail Req/Res message, a Payment Service Selection Req/Res message, a Payment Detail Req/Res (PnC) message, an Authorization Req/Res message, a Charge Parameter Discovery Req/Res message, or a Power Delivery Req/Res message. For direct current (DC) charging, the plurality of messages may further include at least one of a Cable Check Req/Res message and a PreCharge Req/Res message.

The receiving and confirming of the session access request may include identifying session identification information, identification information of the EVSE, and identification information of an electric vehicle communication controller (EVCC) included in the session access request received from the user device. The requesting of the session authentication may include generating a random number and providing the random number to the user device when a result of confirming the session access request is positive. The session script authentication value may be derived by inputting the random number generated by the EVSE, a random number generated by the user device, and a session script hash of the corresponding session to a hash function.

Furthermore, according to exemplary embodiments of the present disclosure, a charging control apparatus may include a processor and a memory configured to store at least one instruction executable by the processor. Additionally, the at least one instruction may cause the processor to perform a charging session initiation procedure with an EV; calculate a session script hash associated with a charging session; receive and confirm a session access request from a user device; request session authentication to the user device based on a result of confirming the session access request; receive a session script authentication value as a result of the session authentication from the user device; and determine whether to allow a user access to the charging session according to the session script authentication value.

The session script hash may be calculated using a hash chaining scheme based on a plurality messages exchanged in the charging session initiation procedure between the EV and the charging control apparatus before actual power transfer. The plurality of messages in the charging session initiation procedure may be represented in an efficient extensible markup language (XML) interchange (EXI) format.

The plurality of messages in the charging session initiation procedure may include at least one of a Supported Application Protocol Req/Res message, a Session Setup Req/Res message, a Service Discovery Req/Res message, a Service Detail Req/Res message, a Payment Service Selection Req/Res message, a Payment Detail Req/Res (PnC)

message, an Authorization Req/Res message, a Charge Parameter Discovery Req/Res message, or a Power Delivery Req/Res message. For DC charging, the plurality of messages may further include at least one of a Cable Check Req/Res message and a PreCharge Req/Res message.

The receiving and confirming of the session access request may include identifying session identification information, identification information of the charging control apparatus, and identification information of an electric vehicle communication controller (EVCC) included in the session access request received from the user device. The requesting of the session authentication may include generating a random number and providing the random number to the user device when a result of confirming the session access request is positive.

The session script authentication value may be derived by inputting the random number generated by the charging control apparatus, a random number generated by the user device, and a session script hash of the corresponding session to a hash function. The charging control apparatus may be an electric vehicle supply equipment (EVSE).

Furthermore, according to exemplary embodiments of the present disclosure, a charging control method, performed by an EV, may include performing a charging session initiation procedure with an EVSE; calculating a session script hash associated with a charging session; generating a session token based on the session script hash; and providing the generated session token to a user device.

The session script hash may be calculated using a hash chaining scheme based on a plurality messages exchanged in the charging session initiation procedure between the EV and the EVSE before actual power transfer. The plurality of messages in the charging session initiation procedure may be represented in an efficient extensible markup language (XML) interchange (EXI) format.

The plurality of messages in the charging session initiation procedure may include at least one of a Supported Application Protocol Req/Res message, a Session Setup Req/Res message, a Service Discovery Req/Res message, a Service Detail Req/Res message, a Payment Service Selection Req/Res message, a Payment Detail Req/Res (PnC) message, an Authorization Req/Res message, a Charge Parameter Discovery Req/Res message, or a Power Delivery Req/Res message. For DC charging, the plurality of messages may further include at least one of a Cable Check Req/Res message and a PreCharge Req/Res message. The session token may include the session script hash, and may further include at least one identification information of an electric vehicle communication controller (EVCC) mounted within the EV, identification information of the EVSE, and an identifier (ID) of the charging session.

According to the exemplary embodiments of the present disclosure, when using the method and apparatus for controlling EV charging by sharing authentication credential between the EV and the user device, communication security between the EV and the user device may be maintained. In addition, even if there is no communication security between the user device and the EVSE, safety may be secured. Further, a need for certificates in the transport layer may be omitted, and security may be secured in the application layer. In addition, it may be possible to perform efficient authentication using a hash function instead of a complex certificate-based authentication.

BRIEF DESCRIPTION OF DRAWINGS

The present disclosure will become more apparent by describing in detail exemplary embodiments of the present disclosure with reference to the accompanying drawings, in which:

FIG. 9 illustrates an example of a message used for calculating a session script hash according to an exemplary embodiment of the present disclosure;

Figure 1:
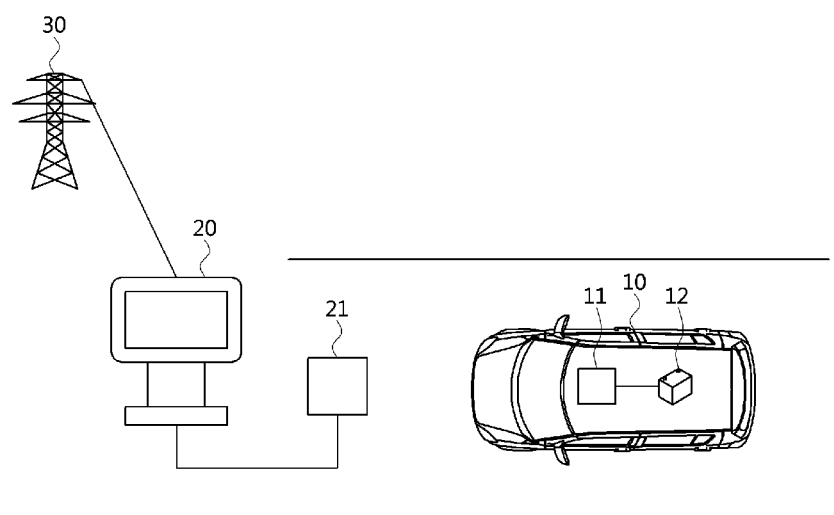
FIG. 1 is a conceptual diagram illustrating a concept of a wireless power transfer (WPT) to which exemplary embodiments of the present disclosure may be applied.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure are disclosed herein. However, specific structural and functional details disclosed herein are merely representative for purposes of describing exemplary embodiments of the present disclosure; however, exemplary embodiments of the present disclosure may be embodied in many alternate forms and should not be construed as limited to exemplary embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, the component may be directly or indirectly connected to the other component. In other words, for example, intervening components may be present. On the contrary, when a component is referred to as being "directly connected to" another component, there are no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. Terms defined in dictionaries generally used are interpreted as including meanings identical to contextual meanings of the related art, unless definitely defined otherwise in the present specification, are not interpreted as being ideal or excessively formal meanings.

Additionally, one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, the below methods may be executed by an apparatus comprising the controller in conjunction with one or more other components, as would be appreciated by a person of ordinary skill in the art.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

According to exemplary embodiments of the present disclosure, an EV charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Additional terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable via wireless charging from an electric vehicle supply equipment (EVSE) without using a physical plug or a physical socket.

"Heavy duty vehicle (H.D. Vehicle)": Any four- or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically via a two-part loosely coupled transformer.

"Wireless power transfer (WPT)": The transfer of electrical power from the alternating current (AC) supply network to the electric vehicle without contact.

"Utility": A set of systems which supply electrical energy and may include a customer information system (CIS), an advanced metering infrastructure (AMI), rates and revenue system, etc. The utility may provide the EV with energy based on a rates table and discrete events. Additionally, the utility may provide information about certification of EVs, interval of power consumption measurements, and a tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that may transfer power. The automatic charging may be performed after obtaining necessary authentication and right.

"Interoperability": A state in which components of a system interwork with corresponding components of the system to perform operations aimed by the system.

Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side including the GA Coil, a power/frequency conversion unit and GA controller as well as the wiring from the grid and between each unit, filtering circuits, at least one housing, etc., necessary to function as the power source of a wireless power charging system. The GA may include the communication elements necessary for communication between the GA and the VA.

"Vehicle assembly (VA)": An assembly on the vehicle including the VA Coil, rectifier/power conversion unit and VA controller as well as the wiring to the vehicle batteries and between each unit, filtering circuits, at least one housing, etc., necessary to function as the vehicle part of a wireless power charging system. The VA may include the communication elements necessary for communication between the VA and the GA. The GA may be referred to as a supply device, and the VA may be referred to as an EV device.

"Supply device": An apparatus which provides the contactless coupling to the EV device. In other words, the supply device may be an apparatus external to an EV. When the EV is receiving power, the supply device may operate as the source of the power to be transferred. The supply device may include the housing and all covers.

"EV device": An apparatus mounted on the EV which provides the contactless coupling to the supply device. In other words, the EV device may be installed within the EV. When the EV is receiving power, the EV device may transfer the power from the primary battery to the EV. The EV device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to adjust an output power level. The GA controller may be referred to as a supply power circuit (SPC), and the VA controller may be referred to as an electric vehicle (EV) power circuit (EVPC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure. The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized when a fault occurs.

"Hazardous live component": A live component, which under certain conditions may generate a harmful electric shock.

"Live component": Any conductor or conductive component intended to be electrically energized in normal use.

"Direct contact": Contact of persons with live components. (See, IEC 61440.)

"Indirect contact": Contact of persons with exposed, conductive, and energized components made live by an insulation failure. (See, IEC 61140.)

"Alignment": A process of finding the relative position of supply device to EV device and/or finding the relative position of EV device to supply device for the efficient power transfer that is specified. In the present disclosure, the alignment may direct to a fine positioning of the wireless power transfer system.

"Pairing": A process by which a vehicle is correlated with a dedicated supply device, at which the vehicle is located and from which the power will be transferred. Pairing may include the process by which a VA controller and a GA controller of a charging spot are correlated. The correlation/association process may include the process of association of a relationship between two peer communication entities.

"High-level communication (HLC)": HLC is a special type of digital communication. HLC is necessary for additional services which are not covered by command and control communication. The data link of the HLC may use a power line communication (PLC), but the data link of the HLC is not limited to the PLC.

"Low-power excitation (LPE)": LPE refers to a technique of activating the supply device for the fine positioning and pairing so that the EV may detect the supply device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are not able to join the BSS. Since the SSID is shown as plain text, the SSID may not provide any security features to the network.

"Extended service set identifier (ESSID)": ESSID is the name of the network to which one desires to connect. ESSID is similar to SSID but a more extended concept.

"Basic service set identifier (BSSID)": BSSID consisting of 48 bits is used to distinguish a specific BSS. With an infrastructure BSS network, the BSSID may be configured for medium access control (MAC) of the AP equipment. For an independent BSS or ad hoc network, the BSSID may be generated with any value.

The charging station may include at least one GA and at least one GA controller configured to manage the at least one GA. The GA may include at least one wireless communication device. The charging station may refer to a place or location having at least one GA, which is installed in home, office, public place, road, parking area, etc. According to exemplary embodiments of the present disclosure, "rapid charging" may refer to a method of directly converting alternating current (AC) power of a power system to direct current (DC) power, and supplying the converted DC power to a battery mounted on an EV. In particular, a voltage of the DC power may be DC 500 volts (V) or less.

According to exemplary embodiments of the present disclosure, "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. The EV may further include an on-board charger (OBC) configured to boost the AC power for the slow charging, convert the AC power to DC power, and supply the converted DC power to the battery.

According to exemplary embodiments of the present disclosure, a frequency tuning may be used for performance optimization. In particular, the frequency tuning may be performed by a supply device and may not be performed by an EV device. Additionally, all the supply devices may be required to provide the frequency tuning over a full range. An electric vehicle power controller (EVPC) may be configured to operate in a frequency range between about 81.38 kHz and 90.00 kHz. A nominal frequency (hereinafter, referred to as a target frequency, a design frequency, or a resonance frequency) for the magnetic field wireless power transfer (MF-WPT) may be about 85 kHz. The power supply circuits may provide the frequency tuning.

Hereinafter, exemplary embodiments of the present disclosure will be explained in detail by referring to accompanying figures. FIG. 1 is a conceptual diagram illustrating a concept of a wireless power transfer (WPT) to which exemplary embodiments of the present disclosure may be applied.

As shown in FIG. 1, a WPT may be performed by at least one component of an electric vehicle (EV) 10 and a charging station 20, and may be used for wirelessly transferring power to the EV 10. In particular, the EV 10 may be usually defined as a vehicle supplying an electric power stored in a rechargeable energy storage including a battery 12 as an energy source of an electric motor which is a power train system of the EV 10.

However, the EV 10 according to exemplary embodiments of the present disclosure may include a hybrid electric vehicle (HEV) having an electric motor and an internal combustion engine together, and may include an automobile and also a motorcycle, a cart, a scooter, and an electric bicycle. Additionally, the EV 10 may include a power reception pad 11 having a reception coil for charging the battery 12 wirelessly and may include a plug connection for conductively charging the battery 12. In particular, the EV 10 configured for conductively charging the battery 12 may be referred to as a plug-in electric vehicle (PEV).

The charging station 20 may be connected to a power grid 30 or a power backbone, and may provide an alternating current (AC) power or a direct current (DC) power to a power transmission pad 21 including a transmission coil via a power link. Additionally, the charging station 20 may be configured to communicate with an infrastructure management system or an infrastructure server that manages the power grid 30 or a power network via wired/wireless communications, and perform wireless communications with the EV 10. The wireless communications may be Bluetooth, ZigBee, cellular, wireless local area network (WLAN), or the like. For example, the charging station 20 may be located at various locations including a parking area attached to the a house, a parking area for charging an EV at a gas station, a parking area at a shopping center or a workplace.

A process of wirelessly charging the battery 12 of the EV 10 may begin with first disposing the power reception pad 11 of the EV 10 in an energy field generated by the power transmission pad 21, and coupling the reception coil and the transmission coil with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning. All or part of the internal components and the reception pad 11 of the EV 10 may be referred to as a vehicle assembly (VA), in which the VA may refer to the previously defined meaning. The power transmission pad or the power reception pad may be configured to be non-polarized or polarized.

When a pad is non-polarized, one pole (e.g., a first pole) may be disposed in a center of the pad and an opposite pole (e.g., a second pole) may be disposed in an external periphery. In particular, a flux may be formed to exit from the center of the pad and return to external boundaries of the pad. When a pad is polarized, a respective pole may be disposed at either end portion of the pad. In particular, a magnetic flux may be formed based on an orientation of the pad. In the present disclosure, the transmission pad 21 or the reception pad 11 may collectively be referred to as a "wireless charging pad".

Figure 2A:
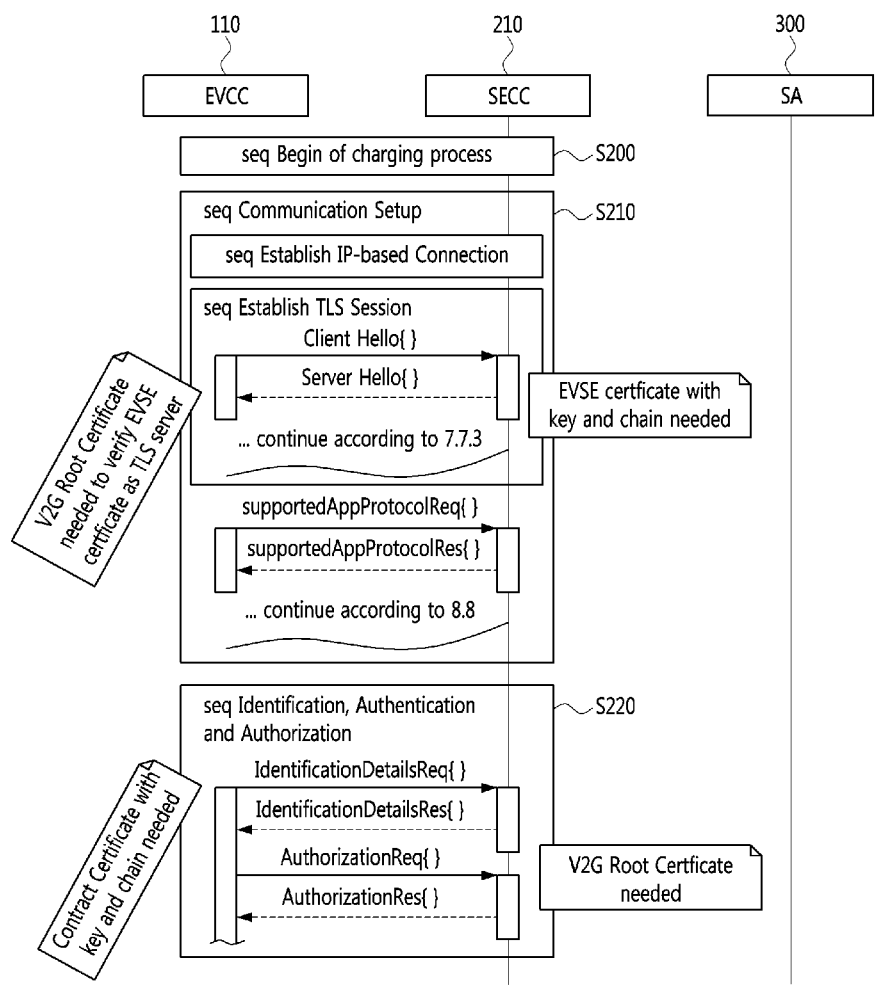
FIGS. 2A and 2B are diagrams for describing a communication method for EV power transfer to which exemplary embodiments of the present disclosure are applied.
Figure 2B:
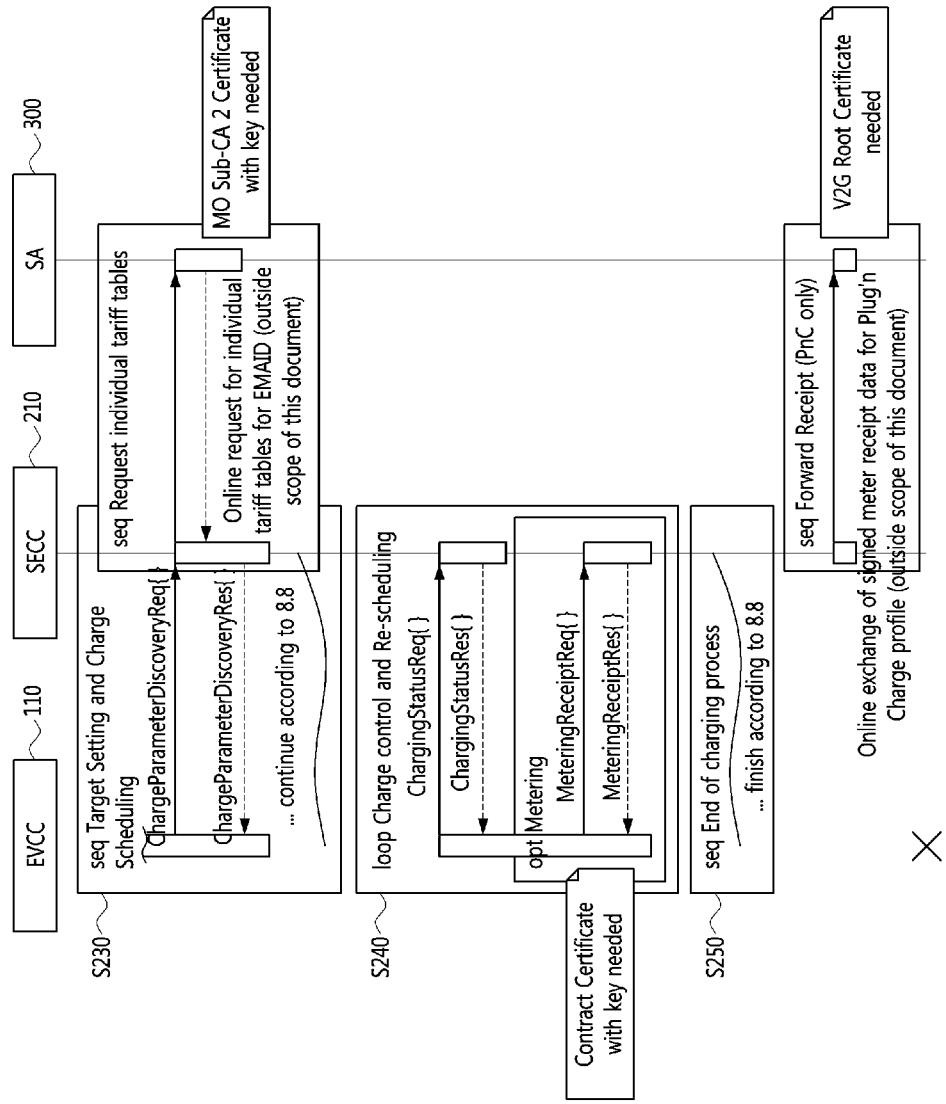

FIGS. 2A and 2B are diagrams for describing a communication method for EV power transfer to which exemplary embodiments of the present disclosure are applied. According to EV charging communication standard documents (e.g., ISO 15118-8 and ISO 15118-20), when using wireless communication for EV charging, communications between an electric vehicle communication controller (EVCC) and a supply equipment communication controller (SECC) may comply with the IEEE 802.11. In other words, EV power transfer may involve communications between the EVCC and the SECC.

As shown in FIGS. 2A and 2B, a communication method for EV power transfer may include beginning a charging process between the EVCC 110 and the SECC (S200), a procedure S210 for communication setup, a procedure S220 for identification, authentication, and authorization, a procedure S230 for target setting and charge scheduling, a procedure S240 for loop charge control and re-scheduling, and/or a procedure S250 for end of the charging process. The communication method shown in FIGS. 2A and 2B may be an example according to a 'Plug and Charge' or 'Park and Charge' (PnC) scenario, and communication examples to which the exemplary embodiments of the present disclosure are applied may not be limited to the example shown in FIGS. 2A and 2B.

The procedure S220 for communication setup may include an Internet protocol (IP)-based connection establishment procedure, and may further include a transport layer security (TLS) session establishment procedure after the connection establishment procedure. In the communication setup procedure or more specifically in the TLS session establishment procedure, the EVCC may require a Vehicle-to-Grid (V2G) root certificate to verify an EVSE certificate as a TLS server, and the SECC may require an EVSE certificate having a key and a chain. In the procedure S230 for identification, authentication, and authorization, the EVCC may require a contract certificate having a key and a chain value, and the SECC may require a V2G root certificate.

In the procedure S240 for target setting and charge scheduling, a procedure of requesting individual tariff tables may be performed between the SECC and a secondary actor (SA) 300. Particularly, the SECC may interwork with the secondary actor 300 located exterior to the vehicle. The secondary actor 300 may be, for example, a charging operator (CO), a service provider, or the like. The procedure S250 for loop charge control and re-scheduling may include an optional metering procedure. In the procedure S250 for loop charge control and re-scheduling (or more specifically the optional metering procedure), the EVCC may require a contract certificate having a key.

Meanwhile, the TLS session establishment procedure included in the communication setup procedure described through the example of FIGS. 2A and 2B is merely exemplary, and the TLS may not necessarily have to be used. The procedural flow described in FIGS. 2A and 2B may require various certificates to be applied at different security layers. For example, there may be SECC certificates used for the EVCC to authenticate the SECC at the TLS layer, and there may be contract certificates used for authentication of the SECC and/or the SA at the application layer. There may also be the V2G root certificate and Sub-CA certificates for verifying the SECC certificate and the contract certificates.

In addition to the above-described certificates, there may be an original equipment manufacturer (OEM) root certificate and an OEM provisioning certificate used to install and update the contract certificates. In particular, the certificates used by the respective V2G entities may include certificate fields as shown in Table 1 below.

TABLE 1

| Certificate field | Description |
|---|---|
| Version | Version of certificate (for 15118 shall be v3 = 0 x 2) |
| Serial number | Unique number of certificate (within the domain of the issuer) |
| Signature algorithm | Used signature algorithm |
| Issuer | Entity, who has issued and signed the certificate |
| Validity period | Time period, in which the certificate is valid |
| Subject | Entity, to which the certificate is issued |
| Public key | Public key corresponding to a private key |
| Issuer UID | Optional issuer unique identifier |
| Subject UID | Optional subject unique identifier |
| Extentions | Optional (see Table 2) |
| Signature | Signature of the certificate generated by the issuer |

Referring to Table 1, the certificate may include a version of the certificate, a unique identification number of the certificate, a signature algorithm used, an entity that issued and signed the certificate, a validity period of the certificate, a subject to which the certificate is issued, a public key corresponding to a private key, a signature of the certificate generated by the issuer, and the like. Further, the certificate may optionally include a unique identifier (UID) of the issuer, a unique identifier of the subject, and/or extensions. In particular, the extensions may include fields according to Table 2 below.

TABLE 2

| Certificate extensions | Description |
|---|---|
| Key usage | Usage of the corresponding private key (e.g. Digital Signature, Non-Repudiation, Key Encipherment, . . . ) |
| Extended Key Usage | Further specification of key usage using OIDs, e.g.: Server Authentication (1.3.6.1.5.5.7.3.1) Client Authentication (1.3.6.1.5.5.7.3.2) Note, sometimes here also the following values are encoded: Netscape SGC (1.3.6.1.4.1.311.10.3.3) Microsoft SGC (2.16.840.1.113730.4.1) SGC stands for Server Gated Crypto and indicated that the server may also use strong cryptography for the connection with the client's browser. This extension was used at the time of strong crypto export control to enable financial web site to provide appropriate protection of the data transfer. |

TABLE 2-continued

| Certificate extensions | Description |
| --- | --- |
| CRL distribution point | Location to retrieve certificate revocation lists |
| OCSP | Location to retrieve OCSP. Refer to IETF RFC 6960 for details. |
| Authority information | Additional authorization information |
| Subject alternative name | Alternative names of the entity |
| Basic constraint = CA | True if the certificate is V2G Root Certificate of SubCA certificate. |

Referring to Table 2, the extensions may include a usage of the private key corresponding to the public key, an extended key usage, a location where a certification revocation list may be retrieved, a location where an OCSP may be retrieved, additional authorization information, an alternative name of the subject, and/or information regarding whether the certificate is a V2G Root certificate or a SubCA certificate.

Figure 3:
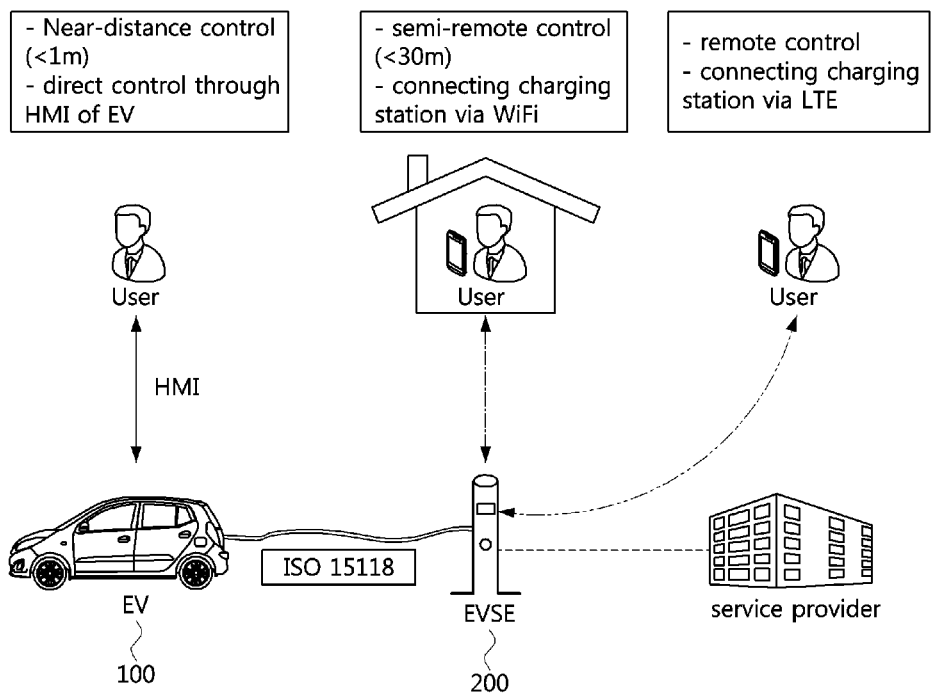
FIG. 3 is a conceptual diagram illustrating structural classification of EV charging control according to an exemplary embodiment of the present disclosure.

FIG. 3 is a conceptual diagram illustrating structural classification of EV charging control according to an exemplary embodiment of the present disclosure. Exemplary use cases for accessing a charging session may be as follows.

Use cases for monitoring the charging status may include detecting or providing a notification regarding an emergency stop due to charging abnormality, checking whether a charging target is achieved through state-of-charge (SOC) monitoring, checking incentives through discharge during bidirectional charging, and monitoring a charging cost due to a change in charging price.

Use cases for charging control may include adjusting a charge schedule based on a change in charge price and a change in the charging target, performing an emergency stop and controlling resumption, changing of a charge service (e.g. between AC and DC, between conductive-type and inductive-type, between charge and charge/discharge, between scheduled charging and dynamic charging, or the like), and the like.

Use cases for monitoring and controlling may include near-distance or remote access of a vehicle owner through a user device, and access by another person (e.g., family member, etc.) other than the vehicle owner.

Referring to FIG. 3, in the monitoring and control method, a structural classification method according to distance may be identified. Near-distance control (e.g. within about 1 meter) may include direct control through a human-machine interface (HMI) of an EV, and semi-remote control (e.g., within 30 meters) may include controls performed while connected to the charging station via WI-FI. In addition, the remote control may include controls performed while connected to the charging station remotely via a mobile communication such as long term evolution (LTE).

Figure 4:
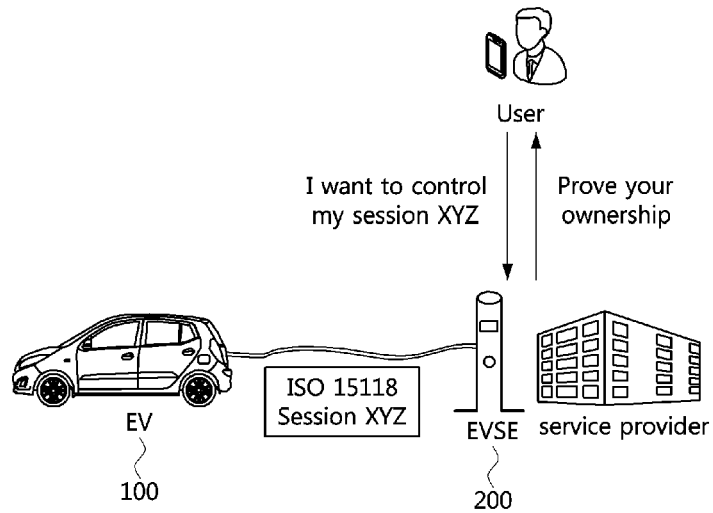
FIG. 4 is a conceptual diagram illustrating an authentication issue in EV charging control using a user device according to an exemplary embodiment of the present disclosure.

FIG. 4 is a conceptual diagram illustrating an authentication issue in EV charging control using a user device according to an exemplary embodiment of the present disclosure. As shown in FIG. 4, owner authentication may be required for a user desiring to charge an EV to access a charging session (e.g., ISO 15118 session 'XYZ') through a user device or the like.

Figure 5:
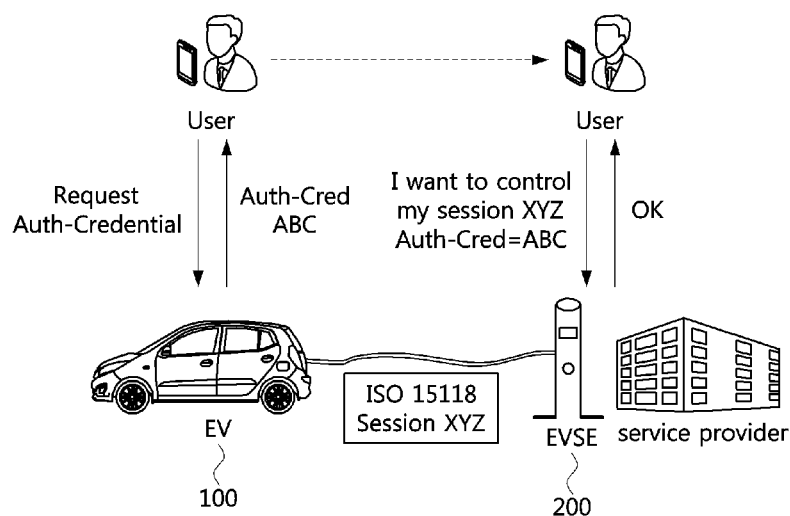
FIG. 5 is a conceptual diagram illustrating necessity of sharing authentication credential in EV charging control using a user device according to an exemplary embodiment of the present disclosure.

FIG. 5 is a conceptual diagram illustrating necessity of sharing authentication credential in EV charging control using a user device according to an exemplary embodiment of the present disclosure. For a user to access the charging session by using a user device, as shown in FIG. 5, the user may request an authentication credential (which may be referred to as 'Auth-Credential' or 'authentication proof information') for the charging session to the EV, and receive the authentication credential. In the example of FIG. 5, the user may prove (e.g., provide authenticating information) ownership by providing an authentication credential 'ABC' to the EVSE (and charging operator).

Figure 6:
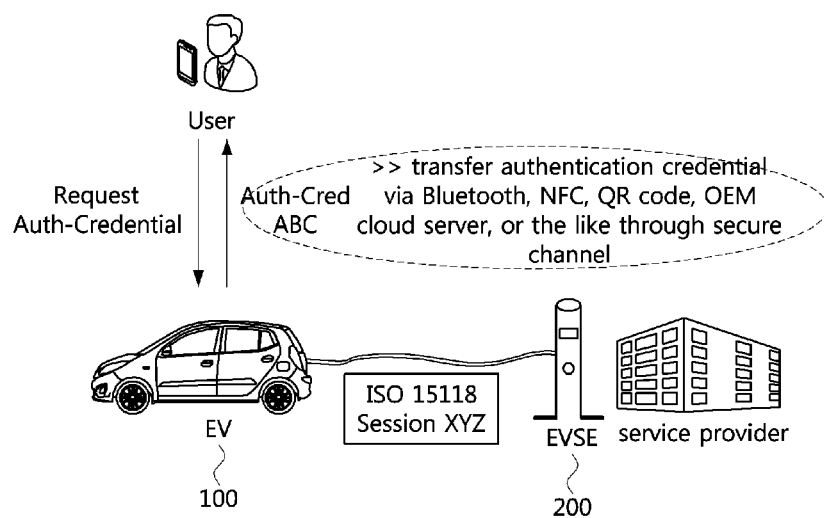
FIG. 6 is a conceptual diagram illustrating a method of transferring authentication credential in EV charging control using a user device according to an exemplary embodiment of the present disclosure.

FIG. 6 is a conceptual diagram illustrating a method of transferring authentication credential in EV charging control using a user device according to an exemplary embodiment of the present disclosure. As a method for the EV to transfer the authentication credential to the user device, there are methods shown in FIG. 6. For example, the EV may be configured to transfer the authentication credential to the user device via a Bluetooth (option 1), a Near Field Communication (NFC), option 2), a QR code (option 3), an OEM cloud server (option 4), or the like. A path through which the authentication credential is delivered is a secure channel.

Particularly, the authentication credential may be a proof of ownership of the charging session on which authentication is currently successfully completed. The authentication credential may be implemented as a TLS session credential (option 1), a session credential according to ISO 15118 (option 2), or a contract authentication (PnC, option 3). For the TLS session credential, which is the first option of the authentication credential considered in the present disclosure, a new TLS may be opened using information of the currently valid TLS session. This may be useful when there is no authentication information in the application (e.g., for ISO 15118 EIM).

As the advantage of this option, functions such as a session identifier (RFC 5246) and a session ticket (RFC 5077), which are present in the TLS specification, are available when the TLS version is below 3.0, and a function for session resumption using a pre-shared key (PSK) (RFC 8664) may be used when the TLS version is 3.0. On the other hand, the disadvantage of this option is that it is available only when using TLS. For example, the ISO 15118 ED.1 may not require TLS in case of EIM.

As a specific implementation, regarding a session identifier, the EV may be configured to transmit a session ID and a session key to the user device. Regarding a session ticket, the EV may be configured to transmit a session ticket and a session key to the user device. In the session resumption procedure using the PSK, the EV may be configured to transmit a session ticket and a session key to the user device. The user device may be configured to request a TLS session resumption to the EVSE and/or server.

For the ISO 15118 session credential, which is the second option of the authentication credential in the present disclosure, a new session may be opened using the currently valid ISO 15118 session information. The advantage is that rapid authentication is possible, but the disadvantage is that it is available only when using TLS in the currently valid ISO 15118 session.

As a specific implementation, an efficient extensible markup language (XML) interchange (EXI) string aggregating all messages from SupportedAppProtocolReq to the last PowerDeliveryRes may be used as a session script, and a value (i.e., HMAC (session script)) obtained by calculating the session script according to a HMAC function may be used as a session hash value. The EV may be configured to transmit [session hash, ISO-15118 session ID, session key] to the user device via a secure channel. In particular, when it is difficult to store the session script in the EV, a chained hashing technique may be used.

For the contract authentication (PnC), which is the third option of the authentication credential in the present disclosure, when contract authentication is performed on the currently valid ISO15118 session information, the same contract authentication may be performed when opening a new session. Advantageously, since the authentication is not related to the existing session information, the information shared by the EV may be simplified. The disadvantage is that this option is available only when using PnC authentication in the valid ISO 15118 session, requires a certificate-based authentication protocol, and potentially leaks the secret key of the contract credential securely stored in a hardware security module (HSM).

As a specific implementation, the EV may be configured to transmit (ISO-15118 session ID, [contract certificate information]) to the user device. In particular, the contract certificate information may be installed once on the user device. In addition, the contract certificate information may include a contract certificate (or credential) and a corresponding private key.

Figure 7:
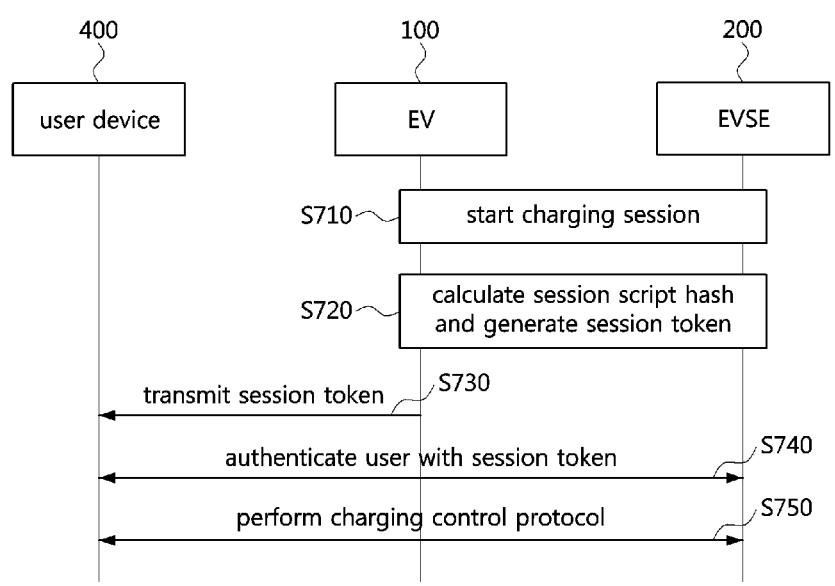
FIG. 7 is a sequence chart of a method for controlling EV charging by sharing authentication credential between an EV and a user device according to an exemplary embodiment of the present disclosure.

FIG. 7 is a sequence chart of a method for controlling EV charging by sharing authentication credential between an EV and a user device according to an exemplary embodiment of the present disclosure. FIG. 7 illustrates an exemplary embodiment when using a session credential according to the ISO 15118. When requesting a session credential according to the ISO 15118, a procedure (or a method of controlling EV charging by sharing authentication credential between an EV and a user device) may include a preparation step, an authentication step, and a control step.

In the preparation step, the EV 100 and the EVSE 200 may commence a charging session (S710), and each of the EV 100 and the EVSE 200 may be configured to calculate a session script hash, and generate a session token based on the calculated session script hash (S720). Thereafter, the EV 100 may be configured to transmit the session token to the user device (e.g., user device such as a mobile phone) (S730). In the authentication step, the EVSE 200 may be configured to authenticate the corresponding user device with the session token presented by the user device (S740). In the control step, a charging control protocol between the user device and the EVSE may be performed (S750).

According to the above-described exemplary embodiment, an EV according to an exemplary embodiment of the present disclosure may include a processor and a memory configured to store at least one instruction executable by the processor. The at least one instruction may cause the processor to perform a charging session initiation procedure with an EVSE; calculate a session script hash associated with a charging session; generate a session token based on the calculated session script hash; and provide the generated session token to a user device.

Figure 8:
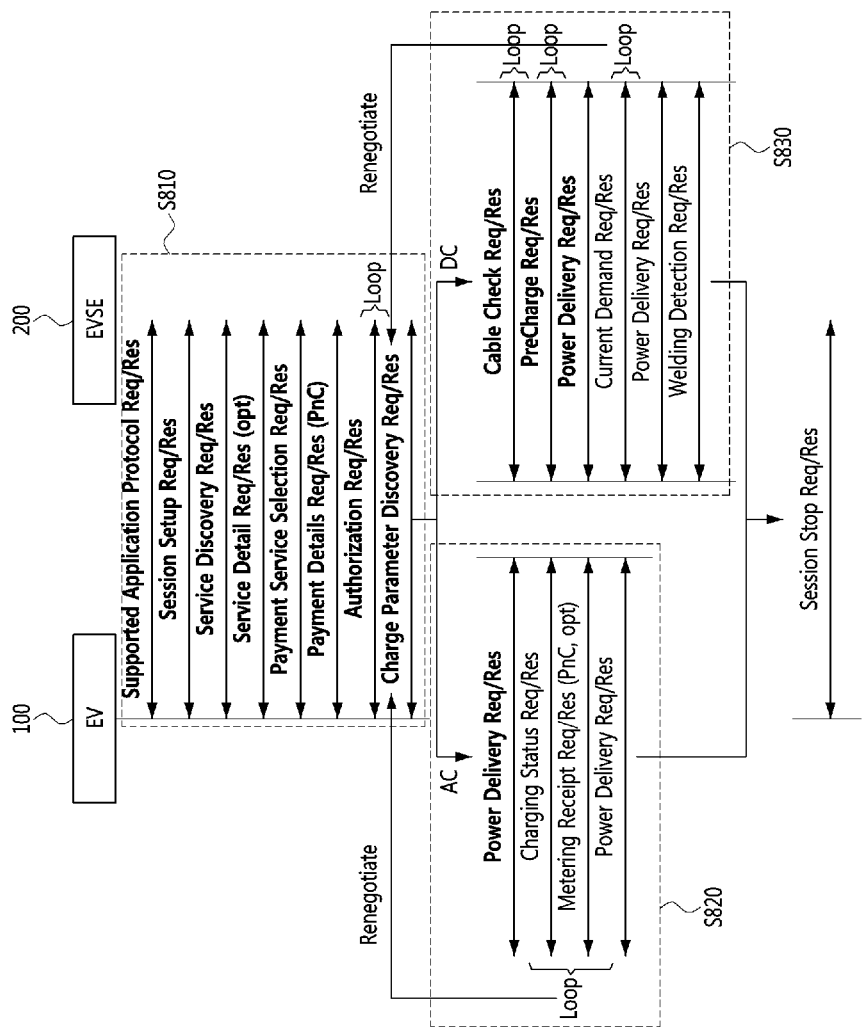
FIG. 8 is a sequence chart of a charging session initiation procedure in a charging control method according to an exemplary embodiment of the present disclosure.

FIG. 8 is a sequence chart of a charging session initiation procedure in a charging control method according to an exemplary embodiment of the present disclosure. In the charging session initiation procedure shown in FIG. 8, session progression may be performed according to the ISO 15118. As shown in FIG. 8, the charging session initiation procedure may include, between the EV 100 and the EVSE 200, Supported Application Protocol request/response (Req/Res), Session Setup Req/Res, Service discovery Req/Res, Service Detail Req/Res (optional), Payment Service Selection Req/Res, Payment Detail Req/Res (PnC), Authorization Req/Res), and Charge Parameter Discovery Req/Res messages (S810).

Further, when a charging scheme is AC charging, after the Charge Parameter Discovery Req/Res, the procedure may further include Power Delivery Req/Res, Charging Status Req/Res, Metering Receipt Req/Res (PnC, optional), and Power Delivery Req/Res messages (S820). When the charging scheme is DC charging, after the Charge Parameter Discovery Req/Res, the procedure may further include Cable Check Req/Res, PreCharge Req/Res, Power Delivery Req/Res, Current Demand Req/Res, Power Delivery Req/Res, and Welding Detection Req/Res messages (S830).

The initiated charging session may then terminate according to a Session Stop Req/Res. Among the messages exchanged between the EV 100 and the EVSE 200 in the charging session initiation procedure shown in FIG. 8, bolded messages may be used as input values to session script hash calculation to be described later. In other words, Supported Application Protocol Req/Res, Session Setup Req/Res, Service Discovery Req/Res, Service Detail Req/Res (optional), Payment Service Selection Req/Res, Payment Detail Req/Res (PnC), Authorization Req/Res, and Charge Parameter Discovery Req/Res messages may be used as the input values to the session script hash calculation.

In case of renegotiation, for the AC charging, the Power Delivery Req/Res message may be used as the input value to the session script hash calculation, and for the DC charging, the Cable Check Req/Res message, the PreCharge Req/Res message, and the Power Delivery Req/Res messages may be used as the input values to the session script hash calculation.

Meanwhile, after the session initiation procedure, each of the EV and the EVSE may be configured to calculate and store a session script hash. In particular, a session token may be generated based on the session script hash. Specifically, the EV and the EVSE may be configured to calculate the session script hash (SSHash) for the messages from the first message of the charging session initiation procedure to the message before actual power transfer starts. SSHash may have the same calculation results in the EV and the EVSE and SSHash may use a hash chaining technique to use less memory, and SHA256 may be used as a hash function (HO).

SSHash may be derived according to Equation 1 below.

$$M_1 = \text{EXI message of SupportedAppProtocolReq},$$
$$S_1 = H(M_1, <\text{version}>)$$

$$M_2 = \text{EXI message of SupportedAppProtocolRes},$$
$$S_2 = H(M_2, S_1)$$

$$M_3 = \text{EXI message of SessionSetupReq}, S_3 = H(M_3, S_2)$$

$$\ldots$$

$$M_n = \text{EXI message of PowerDeliveryRes}, S_n = H(M_n, S_{n-1})$$

$$\text{SSHash} = S_n \qquad \text{Equation 1}$$

In Equation 1, $M_1$ to $M_n$, which are request/response messages exchanged between the EV and the EVSE in the charging session initiation procedure before the actual power transfer, may have an EXI form. $S_n$ may be a value obtained by inputting each message $M_n$ and $s_{n-1}$ to the hash function, and $S_1$ may be a value obtained by inputting the first message $M_1$ and version information (i.e., <version>). Particularly, ISO 15118 schema namespace may be used as '<version>' in Equation 1. $S_n$, which is the final result of the calculation, may be SSHash. In addition, the session token ST may include an identifier of EVCC (EVCC_ID), an identifier of EVSE (EVSE_ID), a session ID (SESSION_ID), and SSHash.

The session token calculated in this manner may be transmitted by the EV to the user device. As a transmission scheme, Bluetooth, Near Field Communication (NFC), universal serial bus (USB), WiFi Direct, QR-code, or the like may be used. The user may securely store the session token in the user device. In particular, it may be assumed that the communication between the EV and the user device is secure. Thus, confidentiality of the session token may be guaranteed.

FIG. 9 illustrates an example of a message used for calculating a session script hash according to an exemplary embodiment of the present disclosure. The message shown in FIG. 9 is the Session Setup Res message in the charging session initiation procedure. A plain extensible markup language (XML) V2G message instance 901 is shown at the top of FIG. 9, and an efficient XML interchange (EXI) format representation 902 corresponding thereto is shown at the bottom of FIG. 9. Meanwhile, the user device may request user authentication to the EVSE using the granted session token.

Figure 10:
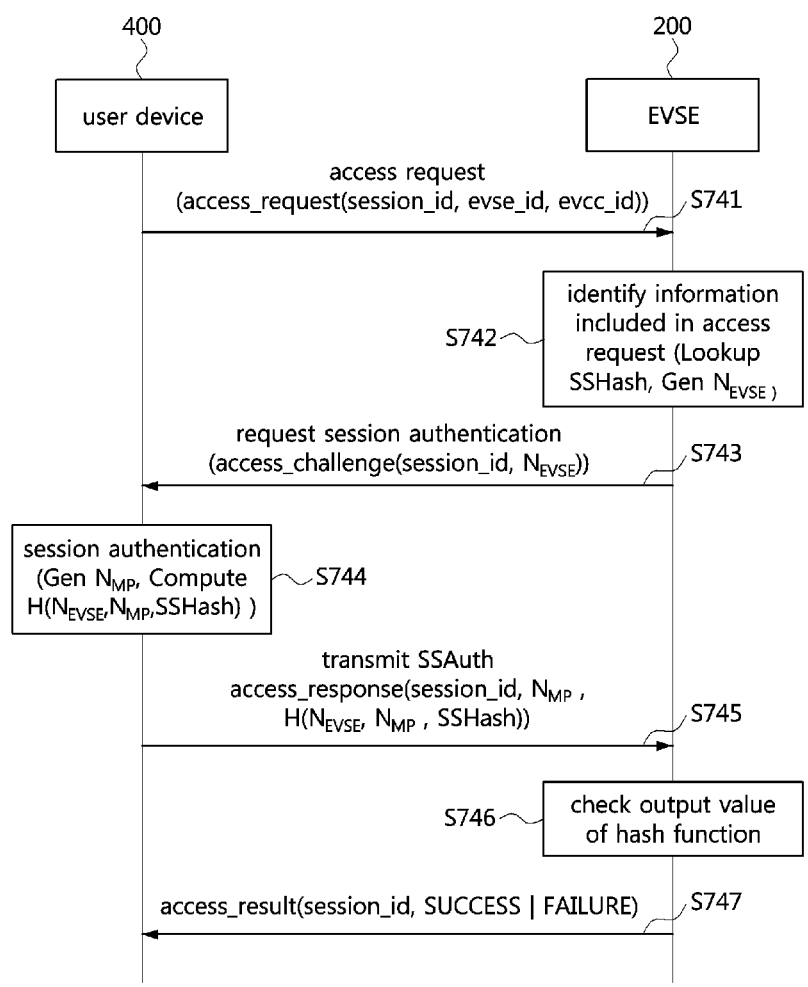
FIG. 10 is a sequence chart illustrating a user authentication procedure in a charging control method according to an exemplary embodiment of the present disclosure.

FIG. 10 is a sequence chart illustrating a user authentication procedure in a charging control method according to an exemplary embodiment of the present disclosure. In other words, the sequence chart shown in FIG. 10 illustrates a detailed process of the user authentication S740 described with reference to the exemplary embodiment of FIG. 7. First, the user device 400 may request access to the EVSE 200 (S741). Particularly, the user device may be configured to transmit (SESSION_ID, EVSE_ID, EVCC_ID) to the EVSE.

The EVSE that receives the access request from the user device may be configured to identify the information included in the access request (S742). More specifically, the EVSE may be configured to check whether the EVSE_ID included in the access request received from the user device matches its own ID, check whether a session corresponding to the SESSION_ID exists, and check whether the EVCC_ID is correct. In response to determining that a result of checking is positive, the EVSE may be configured to request session authentication by generating a 256-bit random number ($N_{EVSE}$) and transmitting the generated random number ($N_{EVSE}$) to the user device (S743).

Upon receiving the session authentication request, the user device may be configured to generate a 256-bit random number ($N_{MP}$), and calculate a session script authentication value SSAuth by inputting the random number ($N_{EVSE}$) received from the EVSE, the random number ($N_{MP}$) generated by itself, and SSHash of the corresponding session to the hash function (S744). In other words, SSAuth=H($N_{EVSE}$, $N_{MP}$, SSHash)). The user device may be configured to transmit the calculated session script authentication value SSAuth to the EVSE (S745).

The EVSE may be configured to identify SSAuth received from the user device, that is, the output value of the hash function (S746). More specifically, the EVSE may be configured to check whether a value, which is obtained by inputting SSHash and $N_{EVSE}$ held by the EVSE and $N_{MP}$ received from the user device to the hash function, coincides with SSAuth received from the user device. Particularly, the hash function used by the EVSE may be the same as the hash function used when the user device calculates SSAuth.

The EVSE may allow the user's access by transferring the result of checking (i.e., access_result) to the user device (S747). In particular, it may be assumed that communication between the user device and the EVSE is not secure communication. The user device performing the charging control method as described above may include at least one processor, a memory configured to store at least one command executable by the at least one processor, and a communication unit.

The at least one instruction may cause the at least one processor to receive the session token generated by the EV; perform user authentication with the EVSE using the session token; and proceed with the charge control protocol. In the performing of the user authentication, the at least one instruction may further cause the at least one processor to transmit the session access request to the EVSE; receive the session authentication request from the EVSE; perform the session authentication to calculate the session script authentication value; and provide the calculated session script authentication value to the EVSE.

Figure 11:
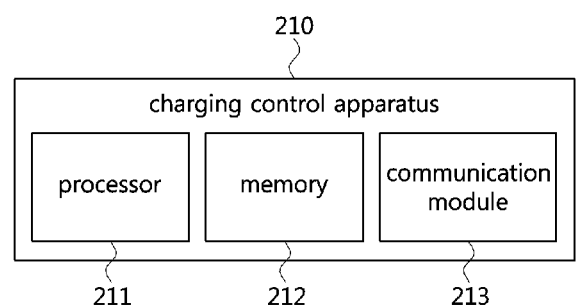
FIG. 11 is a block diagram of a charging control apparatus according to an exemplary embodiment of the present disclosure.

FIG. 11 is a block diagram of a charging control apparatus according to an exemplary embodiment of the present disclosure. The charging control apparatus 210 shown in the exemplary embodiment shown in FIG. 11 may be a supply equipment communication controller (SECC) or an EVSE. In other words, the configuration of the charging control apparatus 210 in the present specification is not limited to the name, it may be defined by its function. In addition, one component thereof may perform a plurality of functions, and a plurality of components thereof may perform one function.

The charging control apparatus 210 may include at least one processor 211, a memory 212 configured to store at least one instruction performing the above-described operation through the at least one processor 211, and a communication unit 213. The processor may be configured to execute the at least one instruction stored in the memory, and may be a central processing unit (CPU), a graphics processing unit (GPU), or a dedicated processor on which the methods according to the present disclosure are performed. The memory may include a volatile storage and/or nonvolatile storage, and may include read only memory (ROM) and/or random access memory (RAM).

Particularly, the at least one instruction may cause the at least one processor to perform a charging session initiation procedure with an EV; calculate a session script hash associated with a charging session; receive and confirm a session access request from a user device; request session authentication to the user device based on a result of confirming the session access request; receive a session script authentication value as a result of the session authentication from the user device; and determine whether to allow a user access to the charging session according to the session script authentication value.

The session script hash may be calculated using a hash chaining scheme based on a plurality messages exchanged in the charging session initiation procedure between the EV and the charging control apparatus before actual power transfer. The plurality of messages in the charging session initiation procedure are represented in an efficient extensible markup language (XML) interchange (EXI) format.

The plurality of messages in the charging session initiation procedure may include at least one of a Supported Application Protocol Req/Res message, a Session Setup Req/Res message, a Service Discovery Req/Res message, a Service Detail Req/Res message, a Payment Service Selection Req/Res message, a Payment Detail Req/Res (PnC) message, an Authorization Req/Res message, a Charge Parameter Discovery Req/Res message, a Cable Check Req/Res message, a PreCharge Req/Res message, and a Power Delivery Req/Res message.

The receiving and confirming of the session access request may include identifying session identification information, identification information of the charging control apparatus, and identification information of an electric vehicle communication controller (EVCC) included in the session access request received from the user device. The requesting of the session authentication may include generating a random number and providing the random number to the user device when a result of confirming the session access request is positive. The session script authentication value may be derived by inputting the random number generated by the EVSE, a random number generated by the user device, and a session script hash of the corresponding hash to a hash function.

Meanwhile, the charging control apparatus 210 may be configured to perform communication with an electric vehicle communication controller (EVCC) through the communication unit 213. In particular, the communication unit may include a communication module configured to perform Wi-Fi communication, and may also include a communication module configured to perform 3G communication and 4G communication. The communication unit 213 may also be configured to communicate with the user device, and thus may include a detailed module capable of implementing a communication scheme such as Bluetooth, Near Field Communication, USB, WiFi Direct, QR-code, or the like.

According to the exemplary embodiments of the present disclosure, when using the method and apparatus for controlling EV charging by sharing authentication credential between the EV and the user device, communication security between the EV and the user device may be maintained. In addition, even if there is no communication security between the user device and the EVSE, safety may be secured. Further, certificates in the transport layer may be omitted, and there is an advantage that security may be secured in the application layer. In addition, it may be possible to perform efficient authentication using a hash function instead of a complex certificate-based authentication.

While some aspects of the present disclosure have been described in the context of an apparatus, the present disclosure may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a specifically programmed computer, or an electronic circuit. In various exemplary embodiments, one or more of the most important method steps may be performed by such an apparatus.

In exemplary embodiments, a programmable logic device (e.g., a field programmable gate array (FPGA)) may be used to perform some or all of the functions of the methods described herein. In addition, the FPGA may be configured to operate in conjunction with a microprocessor to perform one of the methods described herein. Generally, the methods are performed by some hardware device.

The foregoing description has been directed to exemplary embodiments of the present disclosure. It will be apparent, however, that other variations, substitutions and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A charging control method, comprising:
performing, by an electric vehicle supply equipment (EVSE), a charging session initiation procedure with an electric vehicle (EV);
calculating, by the EVSE, a session script hash associated with a charging session;
receiving, by the EVSE, a session access request from a user device, the user device receiving a session token from the EV and being connected to the EVSE remotely via a wireless communication or a mobile communication, wherein the session token is generated based on a session script hash calculated by the EV;
requesting, by the EVSE, session authentication to the user device based on a result of confirming session identification information, identification information of the EVSE, and identification information of an electric vehicle communication controller (EVCC) included in the session access request;
receiving, by the EVSE, a session script authentication value as a result of the session authentication from the user device, the session script authentication value being derived by inputting a random number generated by the EVSE, a random number generated by the user device, and a session script hash of the corresponding session to a hash function; and
determining, by the EVSE, whether to allow the user device access to the EVSE to monitor or control the charging session based on a result of confirming the session script authentication value.

2. The charging control method according to claim 1, wherein the session script hash is calculated using a hash chaining scheme based on a plurality messages exchanged in the charging session initiation procedure between the EV and the EVSE before actual power transfer.

3. The charging control method according to claim 2, wherein the plurality of messages in the charging session initiation procedure are represented in an efficient extensible markup language (XML) interchange (EXI) format.

4. The charging control method according to claim 2, wherein the plurality of messages in the charging session initiation procedure include at least one selected from the group consisting of: a Supported Application Protocol Req/Res message, a Session Setup Req/Res message, a Service Discovery Req/Res message, a Service Detail Req/Res message, a Payment Service Selection Req/Res message, a Payment Detail Req/Res (PnC) message, an Authorization Req/Res message, a Charge Parameter Discovery Req/Res message, a Cable Check Req/Res message, a PreCharge Req/Res message, and a Power Delivery Req/Res message.

5. A charging control apparatus including a processor and a memory configured to store at least one instruction executable by the processor, wherein the at least one instruction causes the processor to:
perform a charging session initiation procedure with an electric vehicle (EV);
calculate a session script hash associated with a charging session;
receive a session access request from a user device, the user device receiving a session token from the EV and being connected to the EVSE remotely via a wireless communication or a mobile communication, wherein the session token is generated based on a session script hash calculated by the EV;
request session authentication to the user device based on a result of confirming session identification information, identification information of the EVSE, and identification information of an electric vehicle communication controller (EVSS) included in the session access request;
receive a session script authentication value as a result of the session authentication from the user device, the session script authentication value being derived by inputting a random number generated by the EVSE, a random number generated by the user device, and a session script hash of the corresponding session to a hash function; and
determine whether to allow the user access to the EVSE to monitor or control the charging session based on a result of confirming the session script authentication value.

6. The charging control apparatus according to claim 5, wherein the session script hash is calculated using a hash chaining scheme based on a plurality messages exchanged in the charging session initiation procedure between the EV and the charging control apparatus before actual power transfer.

7. The charging control apparatus according to claim 6, wherein the plurality of messages in the charging session initiation procedure are represented in an efficient extensible markup language (XML) interchange (EXI) format.

8. The charging control apparatus according to claim 6, wherein the plurality of messages in the charging session initiation procedure include at least one selected from the group consisting of: a Supported Application Protocol Req/Res message, a Session Setup Req/Res message, a Service Discovery Req/Res message, a Service Detail Req/Res message, a Payment Service Selection Req/Res message, a Payment Detail Req/Res (PnC) message, an Authorization Req/Res message, a Charge Parameter Discovery Req/Res message, a Cable Check Req/Res message, a PreCharge Req/Res message, and a Power Delivery Req/Res message.

9. The charging control apparatus according to claim 5, wherein the charging control apparatus is an electric vehicle supply equipment (EVSE).

10. A charging control method, comprising:
performing, by an electric vehicle (EV), a charging session initiation procedure with an electric vehicle supply equipment (EVSE);
calculating, by the EV, a session script hash associated with a charging session;
generating, by the EV, a session token based on the session script hash; and
providing, by the EV, the generated session token to a user device,
wherein the user device is connected to the EVSE remotely via a wireless communication or a mobile communication, requests access to the EVSE, receives a session authentication request from the EVSE, and calculates a session script authentication value according to the session authentication request, the session script authentication value being derived by inputting a random number received from the EVSE, a random number generated by the user device, and a session script hash of the charging session to a hash function, and
wherein the EVSE receives the session script authentication value for an user authentication from the user device, and determines whether to allow the user device accesses to the EVSE to monitor or control the charging session based on a result of confirming the session script authentication value.

11. The charging control method according to claim 10, wherein the session script hash is calculated using a hash chaining scheme based on a plurality messages exchanged in the charging session initiation procedure between the EV and the EVSE before actual power transfer.

12. The charging control method according to claim 11, wherein the plurality of messages in the charging session initiation procedure are represented in an efficient extensible markup language (XML) interchange (EXI) format.

13. The charging control method according to claim 11, wherein the plurality of messages in the charging session initiation procedure include at least one selected from the group consisting of: a Supported Application Protocol Req/Res message, a Session Setup Req/Res message, a Service Discovery Req/Res message, a Service Detail Req/Res message, a Payment Service Selection Req/Res message, a Payment Detail Req/Res (PnC) message, an Authorization Req/Res message, a Charge Parameter Discovery Req/Res message, a Cable Check Req/Res message, a PreCharge Req/Res message, and a Power Delivery Req/Res message.

14. The charging control method according to claim 10, wherein the session token further includes at least one identification information of an electric vehicle communication controller (EVCC) included in the EV, identification information of the EVSE, and an identifier (ID) of the charging session.

* * * * *